United States Patent [19]

Forsberg

[11] Patent Number: 5,076,999

[45] Date of Patent: Dec. 31, 1991

[54] PASSIVE DECAY HEAT REMOVAL SYSTEM FOR WATER-COOLED NUCLEAR REACTORS

[75] Inventor: Charles W. Forsberg, Oak Ridge, Tenn.

[73] Assignee: The United States of America as represented by the United States Department of Energy, Washington, D.C.

[21] Appl. No.: 596,155

[22] Filed: Oct. 10, 1990

[51] Int. Cl.$^5$ ............................................. G21C 9/00
[52] U.S. Cl. ................................... 376/282; 376/299
[58] Field of Search ............... 376/298, 299, 283, 282, 376/367

[56] References Cited

U.S. PATENT DOCUMENTS

| | | | |
|---|---|---|---|
| H119 | 9/1986 | Keeton et al. | 376/299 |
| 3,702,281 | 11/1972 | Birts et al. | 376/299 |
| 4,587,079 | 5/1986 | Fajeau et al. | 376/282 |
| 4,666,661 | 5/1987 | Fredell et al. | 376/299 |
| 4,812,286 | 3/1989 | Gluntz | 376/282 |

FOREIGN PATENT DOCUMENTS 3223593 9/1988 Japan .................................. 376/283

Primary Examiner—Brooks H. Hunt
Assistant Examiner—Frederick H. Voss
Attorney, Agent, or Firm—Stephen D. Hamel; William R. Moser; Richard E. Constant

[57] ABSTRACT

A passive decay-heat removal system for a water-cooled nuclear reactor employs a closed heat transfer loop having heat-exchanging coils inside an open-topped, insulated box located inside the reactor vessel, below its normal water level, in communication with a condenser located outside of containment and exposed to the atmosphere. The heat transfer loop is located such that the evaporator is in a position where, when the water level drops in the reactor, it will become exposed to steam. Vapor produced in the evaporator passes upward to the condenser above the normal water level. In operation, condensation in the condenser removes heat from the system, and the condensed liquid is returned to the evaporator. The system is disposed such that during normal reactor operations where the water level is at its usual position, very little heat will be removed from the system, but during emergency, low water level conditions, substantial amounts of decay heat will be removed.

6 Claims, 2 Drawing Sheets 5,076,999

PASSIVE DECAY HEAT REMOVAL SYSTEM FOR WATER-COOLED NUCLEAR REACTORS

The invention was made under Contract No. DE-AC05-84OR21400 between Martin Marietta Energy Systems, Inc., and the U.S. Department of Energy.

FIELD OF THE INVENTION

This invention relates generally to safety systems for nuclear reactors and more particularly to passive systems for removing decay heat from water-cooled nuclear reactors.

BACKGROUND OF THE INVENTION

In a water-cooled nuclear reactor that has operated for a significant length of time, radioactive fission products build up in the reactor core. These fission products generate radioactive heat even when the reactor is shut down, with typical decay heat generation being one percent of the reactor full-power heat generation rate. If the reactor core is not cooled after shutdown, either by use of normal shutdown procedures or post-accident shutdown procedures, the reactor core may melt. Depending on details of reactor design and mode of reactor shutdown, decay heat removal may be accomplished by cooling the hot water reactor or allowing the reactor water to boil with steam exiting the reactor and adding makeup water to the reactor. In either case, active cooling systems are used to cool the reactor and prevent a reactor core meltdown.

Active systems such as these can fail due to equipment failure or operator error as happened at Three Mile Island. What is needed is a passive decay heat removal system of high reliability that becomes automatically activated upon loss of coolant and which may have its operability verified during normal operations.

Various approaches toward devising passive cooling systems for water-cooled reactors are disclosed in the following papers presented at the International Atomic Energy Agency Technical Committee Meeting on Passive Safety Features in Current and Future Water-Cooled Reactors in Moscow on Mar. 21-24, 1989:

- Application of Passive Systems in WWER-1000 Design Project of Increased Safety: Part I, V. I. Naletov, G. A. Tarakov, E. M. Damrin, and N. B. Trunov.
- Application of Passive Systems in WWER-1000 Design Project of Increased Safety: Part II, T. A. Brantova and N. S. Fil.
- Analysis of the Possibility to Increase WWER-440 Safety Level on the Base of Passive Systems, B. Dimitrov.

The systems disclosed in these papers rely on opening of air doors to obtain cooling or depend upon flooding of the reactor by water located above the reactor containment level. Placement of an open-top box inside the pressure vessel in combination with a closed circuit heat exchanging loop as in the present invention is not disclosed in the prior art known to the applicant.

SUMMARY OF THE INVENTION

This invention is directed to a passive decay-heat removal system for water-cooled nuclear reactor in which an open-topped insulated box is located inside the reactor vessel and positioned below the water level that exists during normal operations of the reactor. A heat exchanger which evaporates fluid within a closed loop is disposed within the box, forming one end of a closed heat-transfer loop communicating with a condenser located outside of the pressure vessel and above the reactor water level. Heat removal by the heat-transfer loop during normal operations is limited owing to the immersion of the evaporator heat exchanger under water and to cooling of the water in the box by natural circulation heat transfer and thermal stratification in the box, which separates cold water therein from an upper layer of hot water, isolating coils of the evaporator from hot reactor water. Upon dropping of the level of the reactor coolant water, as might incur in an emergency situation, water drains from the box, exposing the heat exchanger therein to high temperature steam. The vapor produced in the evaporator then circulates through the loop to the condenser where it is condensed to liquid on the outside of the containment vessel, releasing heat to the open environment (atmosphere, lake, or soil) in the process. The resulting condensed liquid then flows by gravity back to the evaporator. This provides for continuous removal of decay heat by a system with no moving parts that might malfunction. Owing to the minimized flow, which occurs during normal reactor operation, loss of heat and the resulting loss of reactor efficiency is held to a very low level.

It is, therefore, an object of this invention to provide a passive system for removal of decay heat from a water-cooled nuclear reactor.

Another object is to provide such a system that becomes operable upon loss of coolant water without operator invention.

Yet another object is to provide a passive heat removal system that has no moving parts.

Still another object is to provide a system in which removal of heat from the reactor during normal operation is minimized.

Other objects and advantages of the invention will be apparent from the following detailed description and the appended claims.

Description of the Preferred Embodiment

Figure 1:
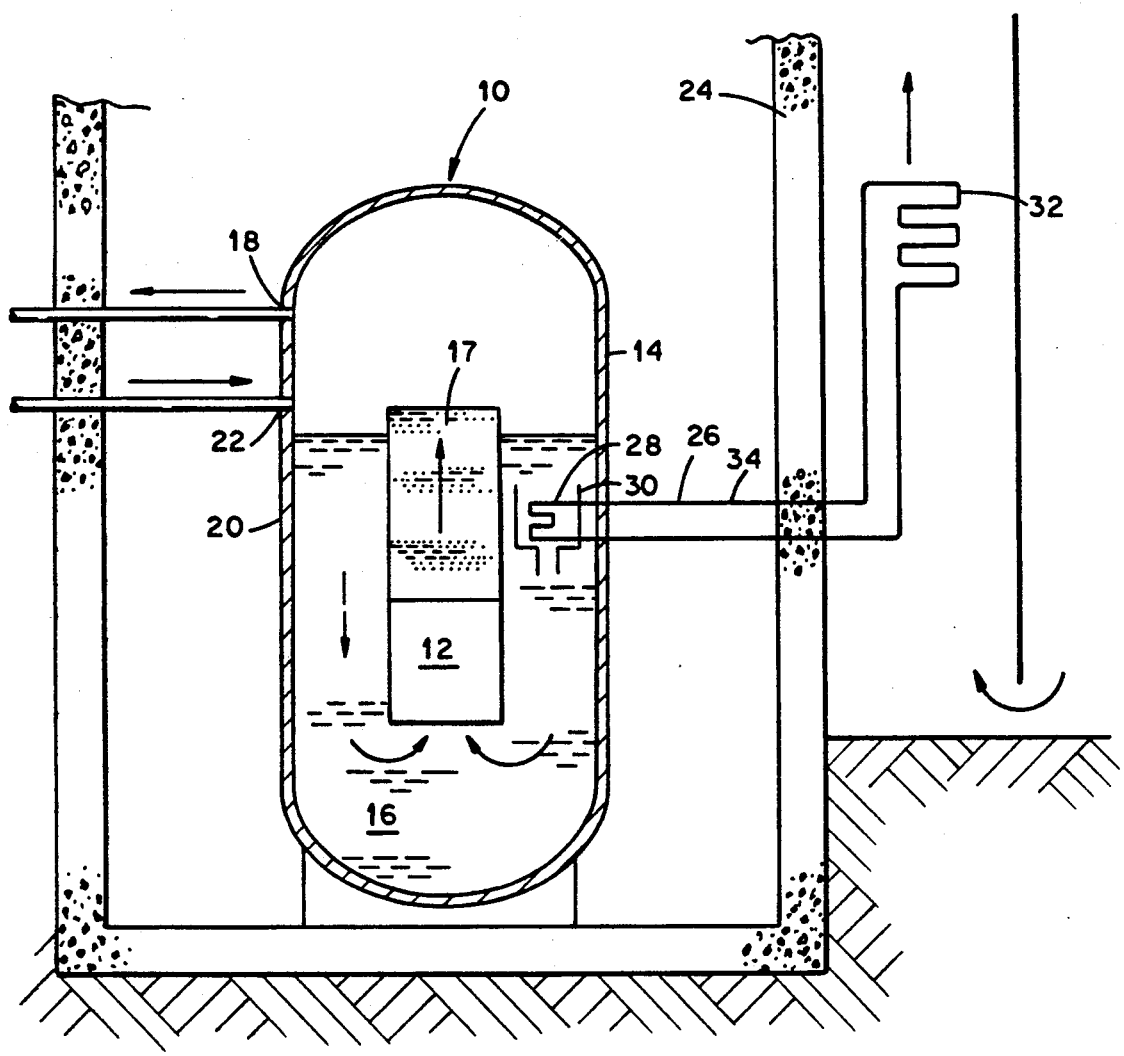
FIG. 1 is a schematic view, partly in section, showing a passive heat removal system.

Referring to FIG. 1 of the drawings, there is shown a boiling water nuclear reactor 10 having a core 12 disposed in a generally cylindrical pressure vessel 14 spaced apart from the bottom of the vessel so as to allow flow of coolant water 16 therethrough. In normal operation of the reactor, water boils in the reactor core, producing a steam-water mixture that moves upward through region 17 above the reactor core. The steam and water separate, with steam going to a turbine (not shown) through outlet 18 and water being returned to the core via downcomer 20 of the vessel 14. Feed water to replace water converted to steam is applied to the reactor vessel through inlet 22. A containment wall 24 encloses the reactor vessel, preventing release of radioactive materials to the environment in the event of an accident.

The passive heat removal system of the present invention includes a natural circulation heat transfer loop 26 having at one end heat exchanging evaporator coils 28 disposed in an open-topped insulated box 30 within the reactor vessel and at its other end condensing coils 32 placed outside of the containment wall and above the normal water level within the reactor. Loop 26 includes a line 34 communicating the top of evaporator coil with condensing coil 32, providing for upward passage of vapor and return line 36 in which condensed liquid collected at the bottom of the condenser coil is returned to the evaporator coil by gravity. The heat-transfer loop works by natural circulation, releasing heat to the atmosphere upon condensation of the vapor as described. The loop contains a heat-transferring fluid such as water or ammonia.

Figure 2:
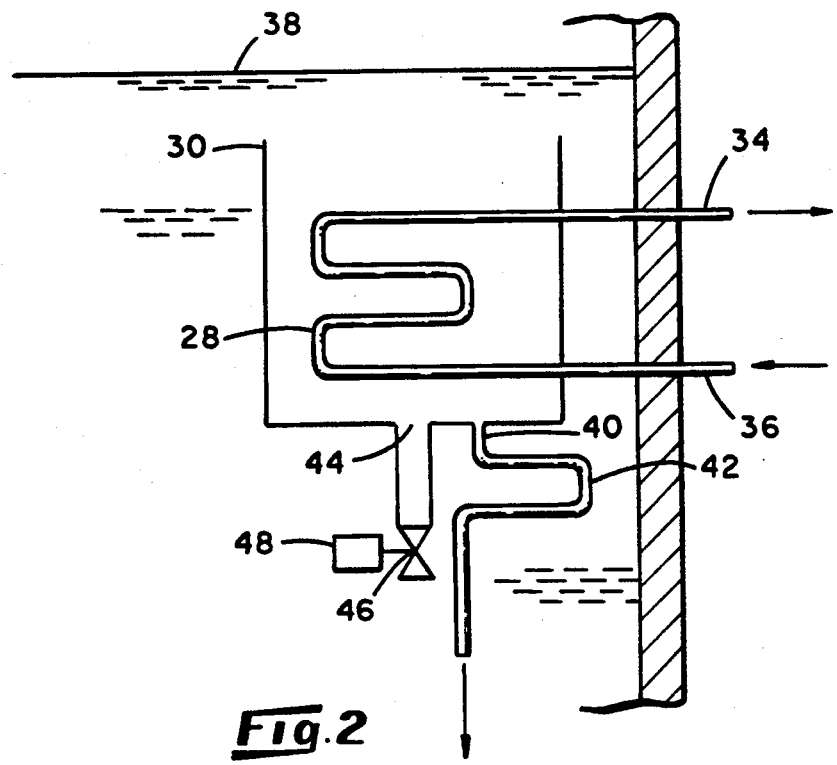
FIG. 2 is a schematic view showing operation of the evaporator within the reactor pressure vessel during normal reactor operating conditions.

FIG. 2 shows operation of components of the system within the reactor vessel during normal operation, when water level 38 is above the top of box 30. In this mode of operation, only a minimal amount of heat is removed by the natural circulation heat transfer loop. A small amount of vapor is produced in coils 28 conveyed to the condensing coils 32 and returned as a liquid to coils 28 through line 36. However, the water in box 30 is thereby cooled, and the cool water, being denser than the hot water, separates by thermal stratification, resulting in isolation of the evaporator coils from hot reactor water. A drain pipe 40 at the bottom of box 30 allows limited flow past the evaporator coil through the box. Drain pipe 40 is sized to be small enough that the heat removal rate through the evaporator coil is determined by the flow rate of water by the coils and through the drain pipe rather than by the heat transfer characteristics of the coils. The drain pipe may also include a U-shaped heat exchanging portion 42 to warm the water in the pipe and bring its density near that of the surrounding water and thus minimize water flow in the drain pipe during reactor operation. A second outlet 44 may also be provided at the bottom of box 30, this outlet being controlled by valve 46 operated by motor 48. This allows the passive heat removal system to be operated in a controlled, active mode, with the rate of heat removal being substantially increased. A system including such features may be used by an operator to initiate normal cool down or to initiate decay heat removal by an operator or by automated controls before the reactor water level drops.

Figure 3:
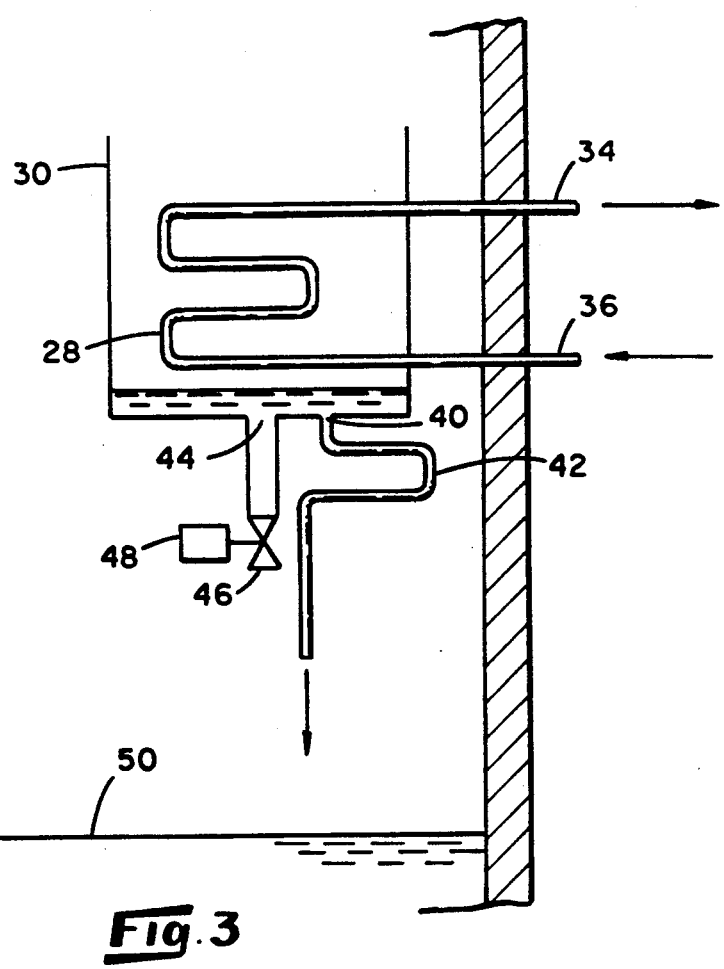
FIG. 3 is a schematic view showing emergency operation of the evaporator.

Operation of the system under an emergency loss of coolant situation is shown in FIG. 3. In this situation, much of the reactor coolant water will have been lost, leaving a water level 50 well below the top of box 30 and associated components. The rate of removal of heat by the heat transfer loop increases rapidly under these conditions owing to two separable effects:

1. Water flow through the insulated box is limited. During normal reactor operation, the liquid water is cooled. During emergency operation, steam is first condensed to water, and the water is then cooled. Heat removal per unit of water drained from the box is much higher when steam is condensed and the condensed water is cooled.

2. The water flow rate through the box increases rapidly as the downcomer is exposed to a steam environment. The rate of flow through the pipe is determined by the available pressure drop across the and drain pipe. The available pressure drop is the difference in static pressure generated by the column of fluid in the reactor downcomer versus that generated by the fluid in the box and drain pipe. This in turn depends on the density of the water in the box and pipe versus density of water or steam outside the drain pipe in the downcomer. Steam is much less dense than hot water; hence, there is more pressure drop to move water through the drain pipe, and flow of water through the drain pipe is much faster when the downcomer is filled with steam. The ratio of the heat removal during full natural circulation heat transfer loop operations under low level water conditions versus rate of heat removal by the system during normal reactor operations may be calculated by the following equations:

$$R = \frac{\text{Heat Removal Rate When Decay Heat Removal System Operating}}{\text{Heat Removal Rate During Normal Reactor Operation}}$$

$$= \frac{[\text{Water Flowrate Through System}][\text{Heat Removal Per Unit Mass Flow of Water}]}{[\text{Water Flowrate Through System}][\text{Heat Removal Per Unit Mass Flow of Water}]}$$

For a first approximation, the mass flow rate through the drain is proportional to the square root of the pressure difference across the drain pipe using the standard correlations for fluid flow in pipes. The pressure difference (driving force) across the length of drain pipe is proportional to the difference in average density ($\rho$) between the water in the box (p) and the reactor fluid (r) [water or steam] outside the box/pipe in the downcomer. Thus:

$$R = \frac{[\sqrt{\rho_{p,2} - \rho_{r,2}}][H_{in,2} - H_{out,2}]}{[\sqrt{\rho_{p,1} - \rho_{r,1}}][H_{in,1} - H_{out,1}]}$$

As a numerical example, consider a boiling water reactor with a pressure of 960 psi and a corresponding water temperature of 540° F. The temperature of the water at the bottom of the insulated box is assumed to be 212° F. The temperature of the average water in the drain pipe is assumed to be 500° F. Note that water enters the drain pipe at 212° F., but heat conduction through the walls will reheat the water as it goes down the pipe. It is desirable to warm the water in the pipe so that its density is near that of water in the downcomer to minimize water flow in the drain pipe during normal reactor operations; thus, the drain pipe is shaped like a heat exchanger immediately after leaving the insulated box. The corresponding physical properties are:

| | | | | |
|---|---|---|---|---|
| | $H_{in,2}$ | = Enthalpy Steam (960 psi, 540° F.) | = | 1194.3 Btu/lbm |
| $H_{out,1}$ = | $H_{out,2}$ | = Enthalpy Water (212° F.) | = | 180.2 Btu/lbm |
| | $H_{in,1}$ | = Enthalpy Reactor Water (540° F.) | = | 536.8 Btu/lbm |
| $\rho_{p,2}$ = | $\rho_{p,1}$ | = Average Density of Exit Water (500° F.) | = | 48.9 lb/ft$^3$ |
| | $\rho_{r,2}$ | = Density Steam (960 psi, 540° F.) | = | 2.1 lb/ft$^3$ |
| | $\rho_{r,1}$ | = Density Hot Reactor Water (540° F.) | = | 46.6 lb/ft$^3$ |

The above calculations characterize this passive decay heat removal system. The system dumps small amounts of heat to the environment during normal reactor operations and large quantities of heat to the environment when required. The small continuous loss of heat is relatively unimportant in an economic perspective but is important in a safety perspective. With the use of thermocouples and various other known instruments, the performance of the system can be continuously monitored, providing continuous assurance that the system will perform when required. In effect, the system is then continuously in a test mode during normal reactor operations.

The open-topped box for use in the above-described system may comprise a generally cylindrical vessel made of material such as stainles steel and provided with an outer layer of insulating material such as stainless steel mesh. The heat exchanger for the heat transfer loop may be provided in the form of coil turns of stainless steel tubing, with a substantially large number of coil turns being used for the condenser heat exchanger outside of containment. Conventional valves may be used for the optional drain valve and monitoring equipment.

The above system may be used for any application where a vapor is to be condensed and cooled when the liquid level drops in the vessel in which it is contained. In particular, the same system may be incorporated into recirculating steam generators in any nuclear power plant. In many nuclear power plants, a reactor liquid or gas coolant transfers heat from the reactor core to the steam generators. In the steam generators, the heat is transferred to boiling water, with the steam sent to a turbine to produce electricity. In many of these plants, the steam generators are also used to remove reactor decay heat. In such an application, the present invention assures continual reactor core heat removal by the steam generators in the event of feed water failure to the steam generator with a corresponding decrease in water levels in the steam generator.

While the invention is described above in terms of a specific embodiment, it is not to be understood as so limited, but is limited only as indicated by the appended claims.

I claim:

1. A passive decay-heat removal system for a water-cooled nuclear reactor having a reactor vessel and a reactor core disposed in said vessel for passage of coolant water through said core, said coolant water extending upward to a level substantially above said core in normal operation condition, comprising:

an open-topped box located above said core and immersed in said coolant water at its normal operating level;

a passive closed heat transfer loop including first and second heat exchangers, the first heat exchanger disposed inside said box and forming one end of the loop, and the second heat exchanger disposed outside of said reactor vessel in communication with an outside environment and above the level of first heat exchanger;

means communicating an outlet of said first heat exchanger with an inlet of the second heat exchanger and an outlet of said second heat exchanger with an inlet of the first heat exchanger;

heat-exchanging fluid contained in said loop; and means for draining said box;

whereby during normal operations, a small amount of heat is removed by said closed heat transfer loop and, when water falls to a level below the first heat exchanger, exposing the same to steam, a large amount of heat will be removed from said reactor by condensation of the steam in the box and fluid inside the heat transfer loop.

2. A system as defined in claim 1 wherein said first heat exchanger comprises evaporating coils, and said second heat exchanger comprises condensing coils.

3. A system as defined in claim 1 wherein said drain means comprises a pipe having a heat-exchanging section disposed below and adjacent to an outlet at the bottom of said box.

4. A system as defined in claim 1 wherein said means communicating said heat exchangers comprises a pair of metal tubes disposed to convey vapor from said first to said second heat exchanger in one tube and to return condensed liquid to said first heat exchanger in the other tube.

5. A system as defined in claim 3 wherein said drain pipe has a size selected to enable the rate of removal of heat from said first heat exchanger to be determined by the flow rate of water through said drain paper.

6. A system as defined in claim 1 wherein said reactor is a boiling water reactor.

* * * * *